United States Patent
Poirette et al.

(10) Patent No.: US 10,065,710 B2
(45) Date of Patent: Sep. 4, 2018

(54) ANCHORING LINE FOR A FLOATING BASE, COMPRISING AN ELASTIC DEVICE

(71) Applicants: IFP Energies nouvelles, Rueil-Malmaison (FR); TECHLAM SAS, Cernay (FR)

(72) Inventors: Yann Poirette, Reventin-Vaugris (FR); Daniel Averbuch, Vernaison (FR); Stéphane Buffy, Murbach (FR); Alain Skraber, Sberrwiller (FR)

(73) Assignees: IFP ENERGIES NOUVELLES, Rueil-Malmasison (FR); TECHLAM SAS, Cernay (FR)

( * ) Notice: Subject to any disclaimer, the term of this patent is extended or adjusted under 35 U.S.C. 154(b) by 0 days.

(21) Appl. No.: 15/302,432

(22) PCT Filed: Mar. 19, 2015

(86) PCT No.: PCT/EP2015/055844
§ 371 (c)(1),
(2) Date: Dec. 16, 2016

(87) PCT Pub. No.: WO2015/154965
PCT Pub. Date: Oct. 15, 2015

(65) Prior Publication Data
US 2017/0166285 A1 Jun. 15, 2017

(30) Foreign Application Priority Data
Apr. 7, 2014 (FR) ...................................... 14 53074

(51) Int. Cl.
*B63B 21/50* (2006.01)
*B63B 21/00* (2006.01)
(Continued)

(52) U.S. Cl.
CPC .............. *B63B 21/50* (2013.01); *B63B 35/44* (2013.01); *B63B 2001/044* (2013.01);
(Continued)

(58) Field of Classification Search
CPC ......... B63B 21/00; B63B 21/20; B63B 21/22; B63B 21/24; B63B 21/50; B63B 21/56; E21B 17/01; E21B 43/01
(Continued)

(56) References Cited

U.S. PATENT DOCUMENTS 4,471,709 A   9/1984 Chun
5,257,592 A * 11/1993 Schaefer ................. B63B 21/22
                                                            114/293
(Continued)

FOREIGN PATENT DOCUMENTS

GB    2 299 649 A    10/1996
WO    2011/033114 A2    3/2011
WO    2012/127015 A1    9/2012

OTHER PUBLICATIONS

International Search Report for PCT/EP2015/055844 dated Jun. 16, 2015; English translation submitted herewith (7 Pages).

*Primary Examiner* — Lars A Olson
(74) *Attorney, Agent, or Firm* — Fitch, Even, Tabin & Flannery, LLP

(57) ABSTRACT

The invention relates to anchoring systems for floating bases for the production of energy at sea (floating wind turbine, wave energy, floating hydraulic turbines, ETM platform, etc.) and/or for petroleum exploitation at sea, constituted by at least one anchoring line which comprises at least one portion which is constituted by cable, chain or a combination of the two and at least one elastic device.

20 Claims, 4 Drawing Sheets

(51) Int. Cl.
*B63B 1/04* (2006.01)
*B63B 35/44* (2006.01)

(52) U.S. Cl.
CPC ... *B63B 2021/005* (2013.01); *B63B 2035/446* (2013.01); *Y02E 10/34* (2013.01)

(58) Field of Classification Search
USPC .................................. 114/294; 405/224.4
See application file for complete search history.

(56) References Cited

U.S. PATENT DOCUMENTS

| | | | | |
|---|---|---|---|---|
| 5,363,920 A | * | 11/1994 | Alexander | B63B 21/50 405/224.4 |
| 5,366,324 A | * | 11/1994 | Arlt | E21B 19/006 405/224 |
| 5,873,678 A | * | 2/1999 | Moses | E02D 5/765 405/224 |
| 6,190,091 B1 | | 2/2001 | Byle | |

* cited by examiner

ANCHORING LINE FOR A FLOATING BASE, COMPRISING AN ELASTIC DEVICE

CROSS-REFERENCE TO RELATED APPLICATIONS

This application is a U.S. national phase application filed under 35 U.S.C. § 371 of International Application No. PCT/EP2015/055844, filed Mar. 19, 2015, designating the United States, which claims priority from French Patent Application No. 14/53.074, filed Apr. 7, 2014, the complete disclosures of which are hereby incorporated herein by reference in their entirety for all purposes.

The present invention relates to the field of anchoring floating bases, in particular for offshore petroleum applications and/or applications in the field of renewable marine energies, in particular for floating bases which are intended for wind turbines.

The anchoring system for a floating base has the main function of maintaining the base in position when it is subjected to the forces of wind, current and swell. In order to carry out this function, there are several groups of anchoring (for example, "single point anchoring" and "spread anchoring") and types of anchoring which range from anchoring which is more or less tensioned (for example, "taut" and "semi-taut" anchoring) to catenary anchoring. FIG. 1a illustrates an example of catenary anchoring for anchoring a floating base 1 by means of several anchoring lines 2. FIG. 1b itself illustrates an example of taut anchoring for anchoring the floating base 1 by means of several taut anchoring lines 2.

The anchoring lines are constituted by chains, metal cables, in particular of steel, synthetic cables or a combination of chains and cables. The selection of the type of anchoring and the material is dependent on the location (environmental conditions and depth of water) and the function of the floating base (production, drilling, wind turbine, etc.).

The anchoring lines are subjected to significant stresses which are linked in particular to the wind, the current and the swell. These stresses may involve risks of breakage as a result of fatigue of the anchoring lines. Furthermore, these natural phenomena bring about the movement of the floating base. Consequently, the anchoring lines have to have good resistance to the forces which are brought about and have to enable limited movement of the floating base.

In order to adapt the tension of the anchoring lines to control significant forces and to control the travel limit, the patent applications WO 2011/033114 and WO 2012/127015 propose inserting in an anchoring line a deformable element with tension which varies in accordance with the force. However, the deformable elements which have a damping action, which operate in terms of traction and which are described in these documents are not well adapted to the absorption of significant forces and are bulky and complex.

The invention relates to anchoring systems for floating bases for the production of energy at sea (floating wind turbine, wave energy, floating hydraulic turbines, ETM platform, etc.) and/or for oil exploitation at sea, which are constituted by at least one anchoring line which comprises at least one portion which is constituted by cable, chain or a combination of the two and at least one elastic device which enables the tension of the line to be reduced and a portion of the deformation of the line under the action of wind forces, the swell and the current on the floating base to be absorbed. The invention enables the loads to be reduced in the portion and in the region of the attachment locations of the anchoring line.

THE DEVICE ACCORDING TO THE INVENTION

The invention relates to an anchoring line for a floating base which comprises at least one elastic device. The elastic device comprises:
  a first rigid element,
  a second rigid element, which moves in rectilinear translation relative to the first rigid element, and
  at least one elastic element which is inserted between the first rigid element and the second rigid element.

Advantageously, at least one elastic element operates with a shearing action.

According to one aspect of the invention, at least one elastic element operates with a compression action.

Preferably, the elastic device comprises a plurality of elastic elements which are mounted in series or in parallel.

Preferably, the elastic element is of elastomer material.

Advantageously, the elastic element is adhesively bonded to at least one metal or composite insert.

According to the invention, the tension of the elastic device is between 1 and 60 MN/m.

Advantageously, the anchoring line comprises a chain or a cable which is fixedly joined to the second rigid element.

According to an embodiment of the invention, the first rigid element is fixed to the floating base.

Preferably, the end of the anchoring line which is connected to the second rigid element is orientated using an angled gear arrangement.

Alternatively, the first rigid element is fixedly joined to a chain or a cable which is fixed to the floating base.

According to an embodiment of the invention, the elastic device comprises at least one elastic element which operates substantially with a shearing action and which is placed between a second tubular rigid element and a cylindrical ring.

Advantageously, the elastic device comprises a stop which is formed by a second elastic element which operates with a compression action.

According to another embodiment of the invention, the elastic device comprises a plurality of elastic elements which operate with a compression action, the elastic elements being arranged in series between plates.

Furthermore, the invention relates to a use of an anchoring line according to the invention, for anchoring a wind turbine which is arranged on a floating base, a production or drilling platform for recovering hydrocarbons, a buoy, a floating barge.

Preferably, the anchoring line is taut.

BRIEF DESCRIPTION OF THE FIGURES

Other features and advantages of the method according to the invention will be appreciated from a reading of the following description of non-limiting embodiments, with reference to the appended Figures which are described below and in which:

FIGS. 3a to 3c illustrate an example of an elastic device according to the invention.

DESCRIPTION OF EMBODIMENTS OF THE INVENTION

Figure 1A:
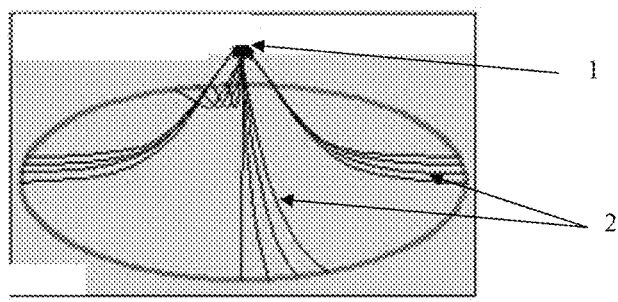
FIGS. 1a and 1b which have already been described illustrate an example of a catenary anchoring and taut anchoring according to the prior art.
Figure 1B:
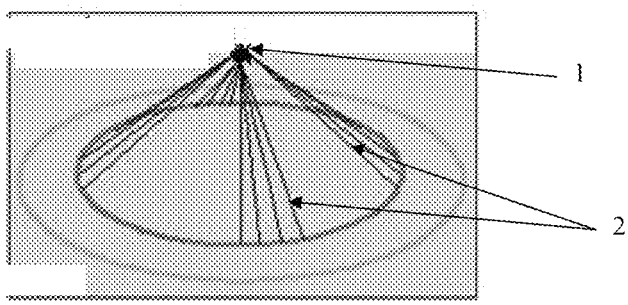

The present invention relates to anchoring systems for floating bases for the production of energy at sea and/or for oil exploitation at sea, which are constituted by means of at least one anchoring line which comprises at least one portion which is constituted by a cable, chain or a combination of the two and at least one elastic device which enables the tension of the line to be reduced and a portion of the deformation of the line under the action of the forces of the wind, swell and current on the floating base to be absorbed. The invention enables the forces in the portion and in the region of the attachment locations of the anchoring lines to be reduced.

According to the invention, the elastic device comprises at least:
- one rigid component which is fixedly joined to a first portion of the anchoring line or the floating base, and
- a second rigid component which is fixedly joined to a second portion of the anchoring line or the portion of the anchoring line, the second rigid component being capable of sliding relative to the first rigid component,
- an elastic element which is inserted between the two rigid components, allowing the sliding movement of one relative to the other.

The rigid components may be produced from metal or composite material. The sliding connection between the two rigid components enables a translation movement of one relative to the other.

An elastic element is also intended to be understood to be an element which is capable of becoming deformed (for example, by means of extension) when it is subjected to a force and to recover its initial shape when the force which is responsible for the deformation is eliminated. Furthermore, the term rigid is intended to refer to an element which does not become deformed or becomes deformed only slightly, compared with the elastic element, when it is subjected to a force (this is the case, for example, for metal components). The elastic element being arranged between the two rigid components, the movement of one relative to the other under the action of a force brings about the deformation of the elastic element. In this manner, the elastic device contributes to the reduction of the tension of the anchoring line and, as a result of its deformation, enables a portion of the deformation of the anchoring line under the action of the forces of the winds, swell and current to be absorbed on the floating base. In this manner, the cable or the chain which constitutes the portion of the anchoring line is subjected to less stress (force and deformation).

A portion of the anchoring line is intended to be understood to be a portion of cable or chain or a combination of cable and chain. The cable which constitutes the portion may be produced from synthetic material or metal, in particular steel. A portion of the anchoring line may, for example, ensure the connection between the floating base and the elastic device, on the one hand, and the elastic device and the sea bed, on the other hand. An anchoring line portion may also ensure the connection between two elastic devices which are inserted in the anchoring line.

Figure 2A:
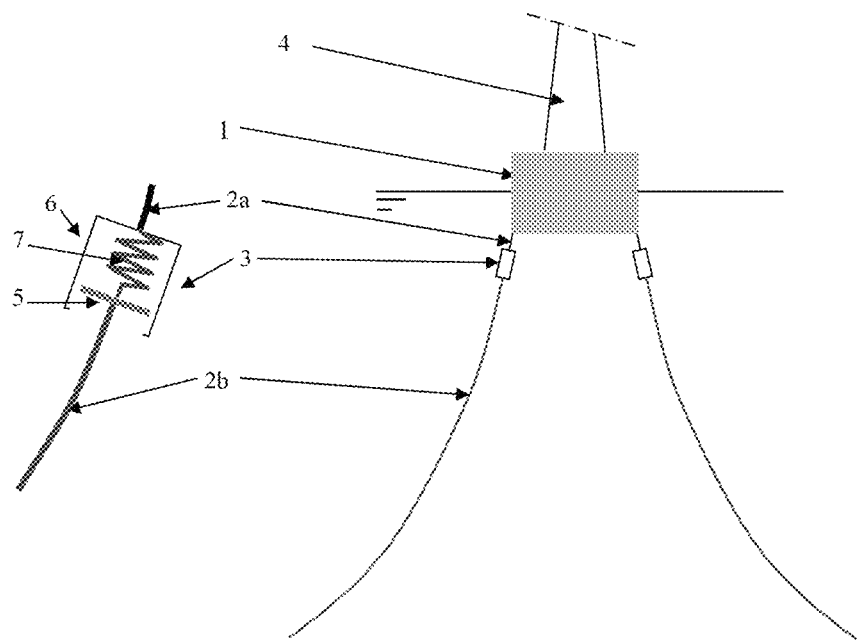
FIGS. 2a and 2b illustrate anchoring systems according to embodiments of the invention.
Figure 2B:
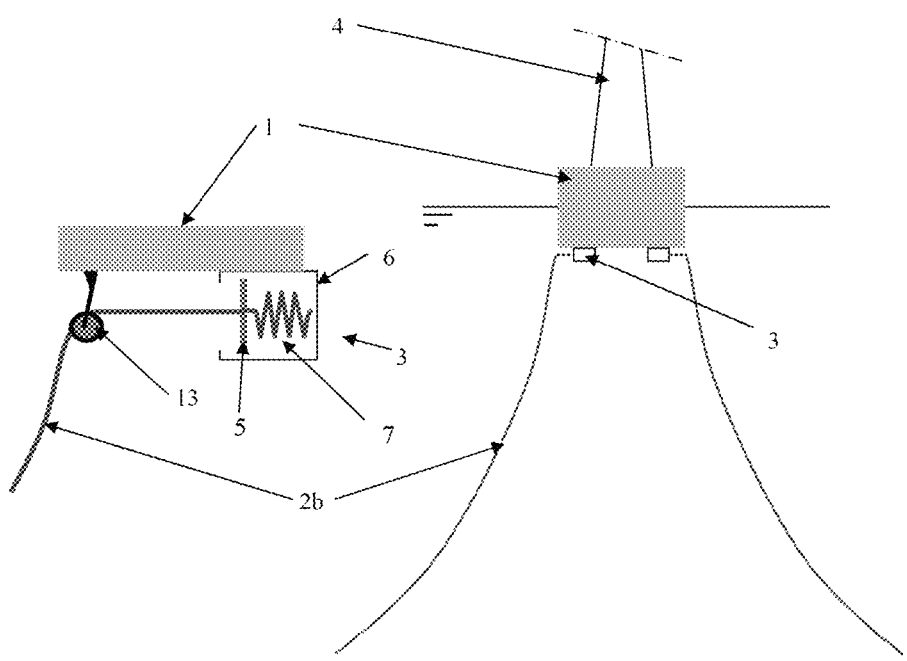

Several locations of the elastic device in the anchoring line may be envisaged: within the anchoring line (cf. FIG. 2a), fixed to the floating base (cf. FIG. 2b).

FIG. 2a illustrates an anchoring system for a floating base of a wind turbine 4 ("offshore") with anchoring lines 2 according to an embodiment of the invention. The anchoring lines 2 enable the floating base 1 to be anchored to the sea bed. Each anchoring line 2 comprises at least one elastic device 3 and two line portions 2a and 2b which are constituted by cable or chain or a combination of the two. The first portion 2a connects the floating base 1 to the first rigid component 6 of the elastic device 3. The second portion 2b connects the second rigid component 5 of the elastic device 3 to the sea bed. The elastic element 7 is inserted between the rigid components 5 and 6 of the elastic device 3.

According to an embodiment of the invention, the first rigid component 6 may be directly attached to the floating base without using the portion 2a with the sliding movement between the two rigid components 5 and 6 of the elastic device 3 along the axis of the portion 2b being maintained.

According to a variant of this embodiment of the invention, the sliding movement between the two rigid components 5 and 6 may be in the plane of the floating base (substantially horizontal). FIG. 2b illustrates an anchoring system of a floating base 1 of a wind turbine 4 ("offshore") with anchoring lines 2 according to this production variant. Each anchoring line 2 comprises at least one elastic device 3 and a line portion 2b which is constituted by cable or chain or a combination of the two. The rigid component 6 of the elastic device is attached to the floating base 1 and the rigid component 5 is connected to one end of the portion 2b so that the sliding movement between the rigid components 5 and 6 is carried out in a plane which is parallel with the bridge of the base 1. A component 13 of the pulley type which is attached to the floating base 1 ensures the angled gear arrangement of the portion 2b in the direction toward the sea bed. The component 13 enables an angled gear arrangement of the anchoring line. In this manner, the chain or the cable is first substantially parallel with the floating base 1, then, after passing into the component 13, the chain or the cable descends toward the anchoring.

Alternatively, the component 13 can move relative to the floating base 1.

According to an aspect of the invention, the elastic device comprises at least one elastomer element which operates substantially with a shearing action. This is because the elastomer material which preferably operates with a shearing action enables significant extensions of the elastic device, which allows the loads in the anchoring line. Furthermore, the elastic device may comprise at least one elastic element which operates with a compression action, for example, in the form of a travel limit stop.

Alternatively, the elastic device comprises at least one elastic element which operates substantially with a compression action. This embodiment may be advantageous if the level of forces of the winds, swell and current cannot be absorbed by a component which operates with a shearing action.

The elastic device may comprise a plurality of elastic elements which are mounted in parallel or in series.

The elastomer element may be adhesively bonded to at least one of the rigid components. This multi-layer structure enables the mechanical characteristics to be controlled in order to create a flexible connection which is adapted to requirements.

The tension of the elastic device is selected from a range between 1 and 60 MN/m.

The elastic device is sized to be sufficiently flexible to advantageously reduce the forces in the anchoring line, in particular in the region of the fixing to the floating base. Furthermore, the elastic device is sized to be sufficiently rigid to maintain its extension within the limits of its configuration: the maximum extension may be substantially 500%.

Figures 3, 3A, 3B:
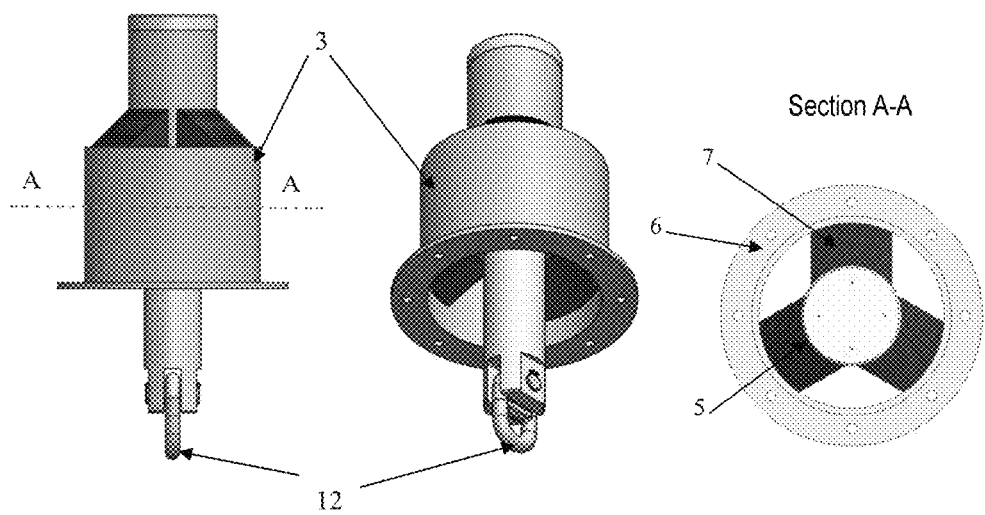

FIGS. 3a and 3b illustrate an embodiment of an elastic device according to the invention. The elastic device 3 comprises at least one means 12 for fixing to a cable or a chain which constitutes a portion of the anchoring line. FIG. 3c is a cross-section AA of the device illustrated in FIGS. 3a and 3b. This example comprises three elastic elements 7 which are arranged in parallel between the first rigid element 6 and the second rigid element 5.

Figure 4:
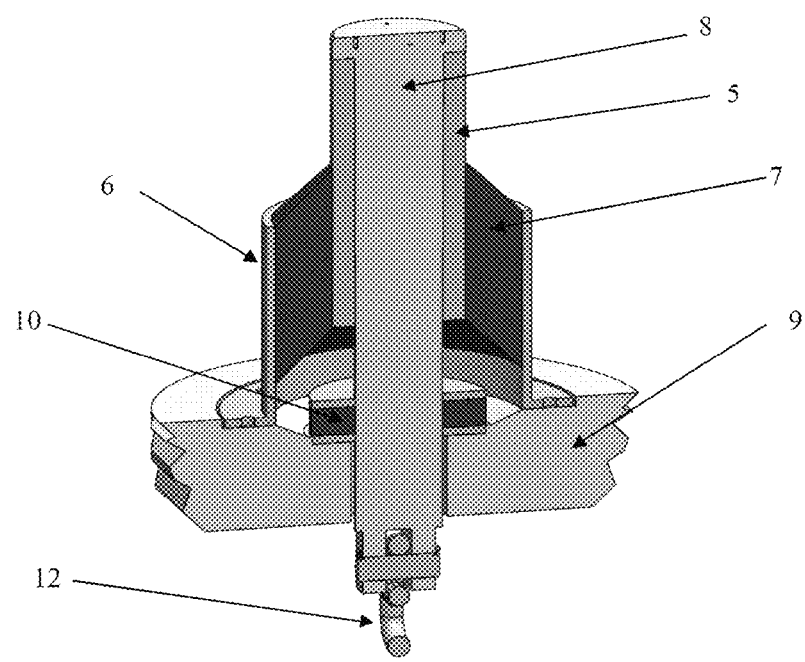
FIG. 4 illustrates an elastic device according to a first embodiment of the invention.

FIG. 4 shows an elastic device according to a first embodiment of the invention, for which the elastic device is fixed to the floating base. This is an elastic device which is said to be laminated. An element is said to be laminated when it comprises a plurality of alternate layers of rigid and flexible material which adhere to each other. According to the embodiment of FIG. 4, the elastic device 3 comprises an elastic element 7 which operates with a shearing action. The elastic element 7 is adhesively bonded, on the one hand, to a rigid insert 5 (second rigid component) which is connected to a rod 8 which is connected to the anchoring line and, on the other hand, to an external insert 6 (first rigid element) which is fixed to an element of the floating base 9. The inserts 5 and 6 may be of metal or composite. The rod 8 comprises at the lower end thereof a connection 12 of the "link" type in order to fix the portion of the anchoring line.

Furthermore, this embodiment may be supplemented by a travel limit stop 10 of the laminated elastic device type. The travel limit stop 10 comprises an elastic element which operates with a compression action. The travel limit stop 10 is fixedly joined to the floating base 9. When a force is applied to the elastic device, the elastic element 7 becomes deformed, the rod 8 moves axially relative to the external insert 6. When the internal insert 5 comes into contact with the travel limit stop 10, the travel limit stop 10 also becomes deformed.

This laminated structure enables a component of reduced size to be proposed.

Figure 5:
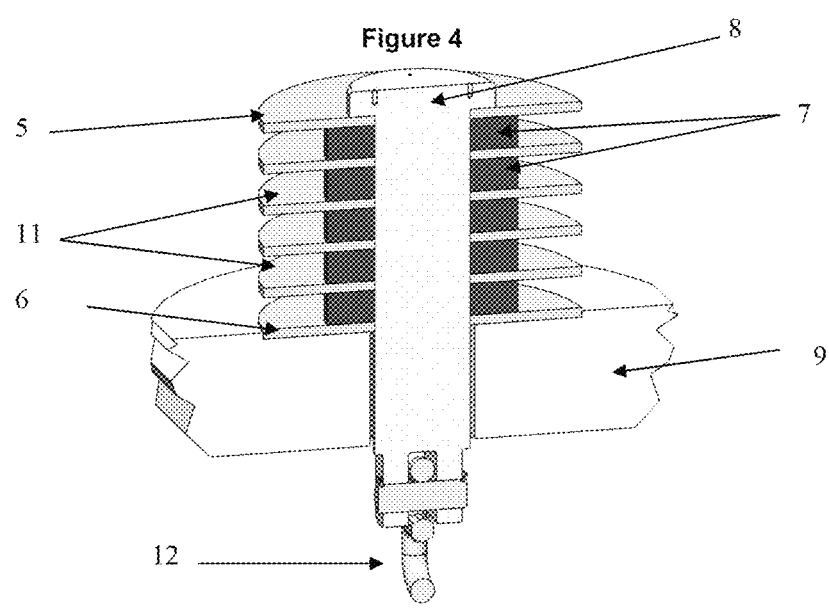
FIG. 5 illustrates an elastic device according to a second embodiment of the invention.

FIG. 5 shows an elastic device 3 according to a second embodiment of the invention. It is an elastic device 3 which comprises a plurality of elastic elements 7 which operate with a compression action and which are arranged in series. According to the embodiment illustrated, the elastic device comprises five elastic elements 7. The elastic elements 7 are arranged between the head of the rod 8 (connected to the anchoring line), at the side opposite a connection 12 of the "link" type, and the floating base 9. An upper plate 5 which forms the second rigid element 5 is connected to the rod 8. A lower plate 6 which forms the first rigid element 6 is fixed to the floating base. Rigid plates 11 are inserted between the elastic elements 7. When a force is applied to the elastic device 3, the rod 8 moves axially relative to the floating base 9 and the force is transmitted to all the elastic elements 7 which become deformed simultaneously.

The embodiments of FIGS. 4 and 5 are not limiting, other production variants may be implemented: the stop 10 of FIG. 4 may be absent, the stop 10 may be composed of a plurality of elastic elements, the elastic device 3 of FIG. 5 may comprise between several elastic elements in series, elastic elements may be placed in parallel with the elastic elements of FIG. 5, for example, using elastic means in the form of rings which are coaxial with the elastic elements 7, etc.

One of the advantages of the anchoring line according to the invention is in particular to be able to be readily sized by combining elastic devices in series or parallel. For example, a combination in series between a first elastic device which operates with a shearing action and a second elastic device which operates with a compression action may be envisaged in order to obtain a good compromise which enables a significant extension at a low force and a high resistance to the maximum forces.

Preferably, the elastic device is arranged on the anchoring line close to the floating base given that the tension forces at the top of the anchoring line are greater than at the bottom of the anchoring line. Furthermore, this configuration facilitates access thereto for the inspection and maintenance thereof, even if it may be reduced as a result of the use of a component with elastic deformation.

The anchoring line according to the invention can be used in particular for anchoring a floating wind turbine ("offshore"), a production or drilling platform for recovery of hydrocarbons, a buoy, a floating barge or any other floating means which requires anchoring.

The anchoring may be of the catenary type, taut or semi-taut.

APPLICATION EXAMPLES

The advantage of the device according to the invention is set out below via simulations which are produced for a floating device on which a wind turbine is installed. For these examples, two extreme operating instances are considered:

a first case for energy production, referred to as an operational case, in which the wind turbine is operational and for which the wind speed $V_{wind}=11.4$ m/s, the significant height of the swell Hs=6 m, and the peak period of the swell Tp=10 s are selected, a second case in which the wind turbine is in a stopped state, referred to as the "idle" state, the thrust is reduced and the swell is extreme, with $V_{wind}=26$ m/s, Hs=11 m, and Tp=21 s.

For these examples, the tension of the elastic device is varied, as is the installation thereof in the line.

The base studied in the simulations is the base referred to as the "Dutch Tri Floater", described in the document: Study to Feasibility of and Boundary Conditions for floating Offshore Wind Turbines, Bulder, B. H. et al., Public Report 2002-CMC-R43, ECN, MARIN, Lagerway the Windmaster, TNO, TUD, MSC, 2002, for which a taut anchoring system which is constituted by steel cables has been sized. The wind turbine in question is the wind turbine with the reference NREL-5MW, as described in the document: Definition of a 5MW Reference Wind Turbine for Offshore System Development, Jonkman J. et al., Technical Report NREL/TP-500-38060, 2009.

The model without any elastic device is taken as a reference.

Figure 6:
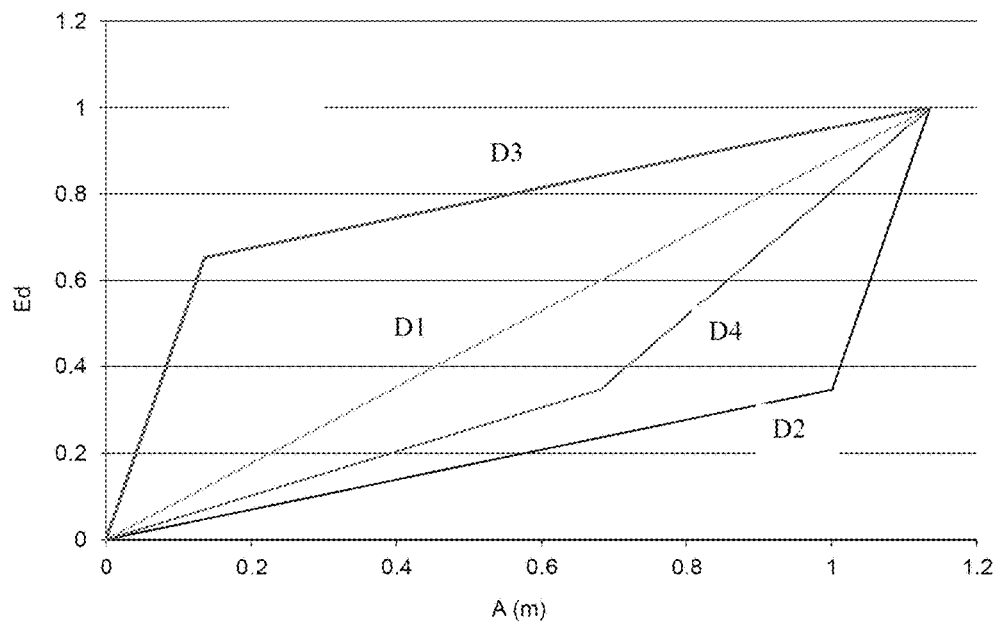
FIG. 6 illustrates the standardized force lines Ed with respect to the extension A of four elastic devices D1 to D4 used in the examples.

Different elastic systems have been inserted in the anchoring lines. FIG. 6 shows the standardized force lines Ed as a function of the extension A of the four elastic devices D1 to D4 used in these simulations.

Figure 7:
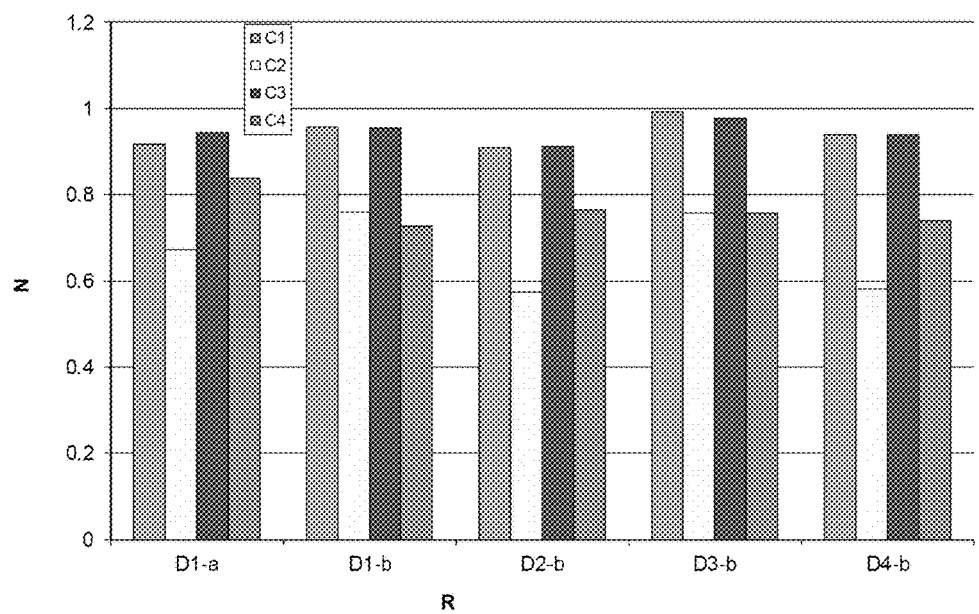
FIG. 7 illustrates histograms which illustrate the mean and maximum forces for nominal operation of a wind turbine and in the event of stoppage of the wind turbine, for several configurations (FIG. 6) and installation of elastic devices.

For each of the cases, (production and wind turbine in the idle state), the mean and maximum forces are calculated as encountered by the different lines during the simulation. FIG. 7 illustrates the mean and maximum tension forces N in the lines in the two cases of standardized operation by the forces of the reference case for different configurations of elastic devices (D1 to D4) and different installations (a: FIG. 2a, b: FIG. 2b) of the elastic device in the anchoring lines. In this Figure, C1 illustrates the mean force encountered by the anchoring line in the operational case, C2 corresponds to the maximum force in the operational case, C3 corresponds to the mean force in the case of the idle state, and C4 corresponds to the maximum force in the case of the idle state.

It should be noted that the mean forces in the anchoring lines, in particular in the region of the fixing of the floating base and the sea bed, are reduced by approximately 10% and that the maximum forces are reduced by approximately from 25% to 40% in accordance with the circumstances, as a result of the insertion of the elastic component compared with a conventional anchoring line.

In conclusion, the impact of the elastic device on the forces in the lines becomes greater as the tension in the lines increases (case of taut anchoring—steel cable). Furthermore, the use of the elastic device has little influence on the movement of the base.

The invention claimed is:

1. Anchoring line for a floating base which comprises at least one elastic device, characterized in that the elastic device comprises:
   a first rigid element,
   a second rigid element, which moves in rectilinear translation relative to the first rigid element,
   at least one first elastic element which is inserted between the first rigid element and the second rigid element, wherein at least one first elastic element operates with a shearing action, and
   a travel limit stop provided between the first rigid element and the second rigid element, the travel limit stop comprising a second resilient element operating with a compression action.

2. Anchoring line as claimed in claim 1, wherein the at least one first elastic element comprises a plurality of elastic elements which are mounted in series or in parallel.

3. Anchoring line as claimed in claim 1, wherein the at least one first elastic element is of elastomer material.

4. Anchoring line as claimed in claim 1, wherein the at least one first elastic element is adhesively bonded to at least one metal or composite insert.

5. Anchoring line as claimed in claim 1, wherein the tension of the elastic device is between 1 and 60 MN/m.

6. Anchoring line as claimed in claim 1, wherein the anchoring line comprises a chain or a cable which is fixedly joined to the second rigid element.

7. Anchoring line as claimed in claim 1, wherein the first rigid element is fixed to the floating base.

8. Anchoring line as claimed in claim 7, wherein the end of the anchoring line which is connected to the second rigid element is orientated using an angled gear arrangement.

9. Anchoring line as claimed in claim 1, wherein the first rigid element is fixedly joined to a chain or a cable which is fixed to the floating base.

10. Anchoring line as claimed in claim 1, wherein the at least one first elastic element is placed between a second tubular rigid element and a cylindrical ring.

11. Anchoring line as claimed in claim 1, wherein the travel limit stop comprises a plurality of elastic elements which operate with a compression action, the elastic elements being arranged in series between plates.

12. Use of an anchoring line as claimed in claim 1, for anchoring a floating base for the production of energy at sea, a platform for drilling or producing hydrocarbons, a buoy, a floating barge.

13. Use as claimed in claim 12, for which the anchoring line is taut.

14. A system for the production of energy at sea, comprising:
   a floating base;
   anchoring line portions comprising cables and/or chains connected to a sea bed; and
   the anchoring line as claimed in claim 1 provided between each anchoring line portion and the floating base.

15. The system as claimed in claim 14, wherein the anchoring lines are taut.

16. A system for drilling or producing hydrocarbons at sea, comprising:
   a platform;
   anchoring line portions comprising cables and/or chains connected to a sea bed; and
   the anchoring line as claimed in claim 1 provided between each anchoring line portion and the platform.

17. The system as claimed in claim 16, wherein the anchoring lines are taut.

18. A buoy system, comprising:
   a buoy;
   anchoring line portions comprising cables and/or chains connected to a sea bed; and
   the anchoring line as claimed in claim 1 provided between each anchoring line portion and the buoy.

19. A floating barge system, comprising:
   a barge;
   anchoring line portions comprising cables and/or chains connected to a sea bed; and
   the anchoring line as claimed in claim 1 provided between each anchoring line portion and the barge.

20. The system as claimed in claim 19, wherein the anchoring lines are taut.

* * * * *